United States Patent
Bone et al.

(10) Patent No.: US 10,680,814 B2
(45) Date of Patent: Jun. 9, 2020

(54) DEVICE KEY SECURITY

(71) Applicant: VODAFONE IP LICENSING LIMITED, Newbury, Berkshire (GB)

(72) Inventors: Nicholas Bone, London (GB); Tim Snape, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/168,384

(22) Filed: May 31, 2016

(65) Prior Publication Data

US 2017/0019254 A1 Jan. 19, 2017

(30) Foreign Application Priority Data

May 28, 2015 (GB) .................................. 1509181.2

(51) Int. Cl.
*H04L 29/06* (2006.01)
*H04L 9/08* (2006.01)
*G06F 21/57* (2013.01)
*H04W 12/04* (2009.01)

(52) U.S. Cl.
CPC .......... *H04L 9/0894* (2013.01); *G06F 21/575* (2013.01); *H04L 9/0891* (2013.01); *H04W 12/04* (2013.01)

(58) Field of Classification Search
CPC ... H04L 9/0866; H04L 9/0838; H04L 9/0891; H04L 63/0869; H04L 63/062; H04L 63/06; H04W 12/04; G06F 21/575
USPC ......................................................... 380/286
See application file for complete search history.

(56) References Cited

U.S. PATENT DOCUMENTS

| | | | |
|---|---|---|---|
| 7,376,234 B1 | 5/2008 | Gardiner | |
| 7,711,960 B2* | 5/2010 | Scarlata | H04L 9/0897 713/155 |
| 2002/0141589 A1* | 10/2002 | Garay | G06F 21/602 380/277 |
| 2004/0107349 A1* | 6/2004 | Sasselli | H04L 9/0891 713/176 |
| 2005/0257062 A1* | 11/2005 | Ignatius | G06F 21/6209 713/176 |
| 2006/0205388 A1* | 9/2006 | Semple | H04L 63/0853 455/411 |
| 2007/0101122 A1* | 5/2007 | Guo | H04L 63/061 713/153 |
| 2007/0240205 A1 | 10/2007 | Holtmanns et al. | |

(Continued)

FOREIGN PATENT DOCUMENTS

GB 2518254 A 3/2015
WO WO2014/182674 A1 11/2014

OTHER PUBLICATIONS

NPL Search Results (Year: 2020).*

(Continued)

*Primary Examiner* — Syed A Zaidi
(74) *Attorney, Agent, or Firm* — Workman Nydegger (57) ABSTRACT

A device, method or server having memory configured to store cryptographic material required to execute one or more device functions. A communications interface for communicating over a network. Logic configured to receive from the server over the communications interface the cryptographic material required to execute the one or more device functions. The device is configured to delete the cryptographic material from the memory.

20 Claims, 3 Drawing Sheets

(56) References Cited

U.S. PATENT DOCUMENTS

| | | | |
|---|---|---|---|
| 2008/0313627 A1* | 12/2008 | Segawa | G06F 21/572 |
| | | | 717/171 |
| 2009/0110195 A1 | 4/2009 | Paykin et al. | |
| 2009/0158032 A1* | 6/2009 | Costa | H04L 63/0442 |
| | | | 713/156 |
| 2009/0209232 A1* | 8/2009 | Cha | H04L 63/0428 |
| | | | 455/411 |
| 2009/0232310 A1* | 9/2009 | Holtmanns | H04L 63/062 |
| | | | 380/277 |
| 2011/0185186 A1 | 7/2011 | Adams et al. | |

OTHER PUBLICATIONS

IPO Search Report for GB1509181.2 dated Nov. 29, 2015.
Search Report issued in EP 16171815 dated Sep. 23, 2016.
Etsi "ETSI TS 133 220 V12.3.0 Generic Bootstrapping Architecture (GBA)" Oct. 22, 2014, pp. 1-94.
Gemplus et al. "Deletion of GBA Keys When 1-15 UICC Is Not Inserted in the ME" 3GPP Draft; C6-060324, vol. CT WG6, May 11, 2006.
Ericsson "Deletion of Ks in ME in GBA_ME" 3GPP Draft: S3-131064, vol. SA WG3, Nov. 4, 2013.
Ghader Ebrahimpour et al. "Introducing the 1-15 GBA Covert Channel in IP Multimedia Subsystem (IMS)" Communications in Computer and Information Science, vol. 428, Jan. 1, 2014, pp. 13-22.

\* cited by examiner

DEVICE KEY SECURITY

CROSS REFERENCE TO RELATED APPLICATIONS

This application claims benefit and priority to GB Application Number 1509181.2, filed on May 28, 2015, the entirety of which is incorporated herein by reference.

FIELD OF THE INVENTION

The present invention relates to a method and system for improving key security within a device and in particular within machine to machine devices or other customer premises equipment.

BACKGROUND OF THE INVENTION

Devices that generate, store, use, process or communication sensitive or private data require particular security measures. For example, communication with the device may need to be encrypted and/or authenticated both at the device and at a remote server or station interacting with the device. This can be particularly important for unattended devices or those that do not typically have interaction with users. Such devices may include Customer Premises Equipment (CPE) and machine to machine (M2M) devices, for example.

Data handled by such devices may include passwords, user IDs, security keys and private or sensitive data such as location, medical data, vehicle driver data (for automotive cases, insurance usages etc.) Furthermore, parts of a code base running on the device may also be considered very sensitive and require protection. This code may include industrial secrets (such as details about what the device is doing and how it works) and also personal sensitive information (a device may have different installed libraries covering different sorts of medical conditions, driver characteristics for vehicles, age, gender, learner driver status and other information).

Any or all parts of these sensitive data may need to be used locally within the device and/or communicated securely with external parties (such as a management server). In particular, sensitive code needs to be protected when being executed locally and also communicated over the air during code or firmware updates. In other words, sensitive data needs to be protected both in transit and at rest.

Sensitivity (for both data and code) may encompass both confidentiality of information but also (and sometimes more importantly) the integrity of the information. It is important that devices run the right code or libraries and that there is confidence that these have not been tampered with. Tampering may lead to security vulnerabilities and hijacking of the device for unintended or malicious purposes.

Protecting data at rest (i.e. when it is not being used by the device or while the device is not in operation) by encrypting it on the device is a known technique. However, this comes with key management problems. Furthermore, it can be difficult to use a single key to protect data or code both at rest and in transit (e.g. in use or with the device operational), which can in turn require encryption of the same data several times. This has significant processing, power and energy overheads. Integrity of code on devices is often managed by secure boot processes. However, this can also have its own limitations.

Encryption of data and/or code may be carried out on a device. This may be to frustrate local tampering or to protect the privacy of a legitimate user in the event that the device is stolen, for example.

A difficulty with this is that the key to decrypt the data (and/or code) may also need to be stored on the device. Alternatively, a human user may enter the key, or some information from which the key is derived (PIN, password or fingerprint for example). The key may also be stored within the device but in an "obfuscated" way (e.g. split into several of portions or held in unexpected locations). The key may be stored within the device in secure hardware (e.g. a Trusted Execution Environment, a Secure Element, Smart Card, a UICC with SIM/USIM/ISIM, etc.)

Similarly, these techniques may be used to store a secret key used to verify the integrity of data or code on the device.

Integrity of code may alternatively be achieved by asymmetric methods. The legitimate code image may be signed with a private key (either a root private key, or an end entity private key, which has a certificate signed under a root private key) and verified on the device using a public key (root public key or end entity public key). This has restricted usage on low end devices (it requires support of public key operations), performance problems (boot may be slow), and a number of significant limitations on the achievable security.

Existing solutions for secure key storage are particularly inadequate for M2M use. Many M2M devices have no user interface and no ability to enter PINs or passwords. Even if this was possible then the security that can be obtained from a human-memorable PIN or password is limited and vulnerable to brute-forcing and resetting of any retry counters. Obfuscation techniques are not adequate for determined hackers who may deobfuscate the keys.

Secure hardware is applicable in some cases especially where the device has a SIM card/UICC, but to use it effectively requires putting specific logic and applications in the SIM card/UICC (such as a Javacard keystore and other key handling logic). Such logic is not typically deployed on mass-produced SIM cards. Hence such a solution adds a lot to the cost and complexity to devices that are made with limited functionality and performance. Secure hardware may also be vulnerable to theft and any wipe instruction (for example) may never reach the device or may be blocked from having its intended effect on the device.

The situation for code and data integrity is even more difficult. Public key operations may not be available or may not be fast enough on limited hardware. The root public key may be vulnerable to tampering. If the root public key is stored in memory then the memory may be re-programmed. If it is stored in fuses then these fuses may be reconnected. If ROM storage is used then the ROM chip may be desoldered and replaced with an alternative. If the key is stored in a Smart Card then the Smart Card may be removed and replaced, for example. Public key methods are also unsuited to protecting device-specific boot images, device specific libraries, or device-specific data as they allow data to be moved around between different devices with the same root public key.

There may also be risks related to version rollback (where an old signed code image, with vulnerabilities, is installed instead of the latest code image). Protecting against this vulnerability may require additional (and partially reprogrammable) secure storage to record the latest version (such as additional fuses). The secure boot may not help if the device is powered up for a long time after boot as this can provide plenty of opportunity for tampering during that time.

Furthermore, these solutions may have difficulty when using the same key (or keyset) to protect data and code in transit (for delivery to the device) as used for data at rest.

This may require complex decryption and re-encryption. A further problem is that it can be difficult to make the key stored locally on the device (for data at rest purposes) available to authorised parties outside the device.

Therefore, there is required a system and method that overcomes these problems.

SUMMARY OF THE INVENTION

A device, such as a machine-to-machine (M2M) device, may require one or more keys for some or all of its functions to operate. The device may have two states. In a first state, the one or more device keys is or are available and/or can be accessed so that the function or functions can operate. In another state the one or more device keys is or are unavailable or not present in the device. Different mechanisms may be put in place to prevent or enable access to the device key or keys. For example, the key may be deleted from the device to make it unavailable. The key may be sent to the device to make it available. In one example, the device key may be encrypted by another key (e.g. a symmetrical key) but retained on the device in encrypted form. To prevent decryption of the device key the other key may be deleted from the device (partially or entirely). Providing access to the device may involve retrieval of the other key to enable decryption of the device key. Therefore, the device key may be stored in a form that cannot be used until the other key (i.e. cryptographic material) is received from the server. Therefore, although the functions require the device key to execute, this is indirectly achieved by receiving cryptographic material, which "unlocks" or makes available the device key. The functions may be "switched on" or "switched off" by receiving and deleting the cryptographic material in this example, rather than by receiving or deleting the actual device key.

The device key or cryptographic material can be made unavailable when the device powers down, off, to a low power mode or another change of mode, for example. Additional security may be achieved by storing the device key (or cryptographic material required to access the device key) in active memory that requires power to store data. Powering off therefore deletes the contents of the memory and any keys or required cryptographic material. When powered up (or changing mode) then the device key may be made available again. The device key may be sent to the device using a bootstrapping process or algorithm, such as GBA, for example. Furthermore, a device manufacturer does not need to provision each device with a device key in advance. However, the device may be associated with a device key that can be stored within a database of device keys and device identifiers (e.g. serial numbers, IMSI, IMEA, or other identifier). Therefore, this simplifies the manufacturing and distribution process.

In accordance with a first aspect there is provided a device comprising:

memory configured to store cryptographic material required to execute one or more device functions;

a communications interface for communicating over a network; and logic configured to:

receive from the server over the communications interface the cryptographic material required to execute the one or more device functions, wherein the device is configured to delete the cryptographic material from the memory.

Therefore, the security of the device may be improved. Deleting the cryptographic material and communicating with the server to receive the cryptographic material may be carried out automatically and/or without user intervention. For example, the cryptographic material (e.g. a device key) only needs to be available for some of the time. When the device is powered down (or changes mode—unlocked to locked, for example) the cryptographic material may be automatically deleted. Certain functions or data may be encrypted with the cryptographic material (or with a part of a key pair) but this cryptographic material (or the decryption key of the pair) may be unavailable or deleted.

This may prevent tampering with the device key or the cryptographic material or prevent it from being recovered without permission. The cryptographic material may be a symmetric key, asymmetric key (key pair or one part of a key pair) or other key. Preferably, the device may be a device capable of communicating with a cellular network but may also use DSL, cable, fibre, Wi-Fi or other network. Deleting the cryptographic material may be achieved in a number of ways. For example, the cryptographic material may be deleted from the device entirely, and only stored outside the device. The cryptographic material may be erased from one location on the device and stored in another location that is not accessible to particular functions of the device. The cryptographic material may be obfuscated (deleted from one location and stored in another in whole or in part) or deleted and stored in an altered way to prevent its access. The cryptographic material and one or more device functions may be stored together in one portion of memory or stored in separate memory chips or areas (or in more than one memory location).

Optionally, the cryptographic material is a device key. In other words, the cryptographic material is directly used by the device functions to execute, without further cryptographic steps (e.g. decryption of one key with another). Therefore, it is such a device key that is received from the server, rather than cryptographic material to decrypt or access a device key that is encrypted on the device (such that the device functions indirectly require the cryptographic material).

Advantageously, the logic may be configured to prevent access to the device by deleting the device key (or part of a device key or key pair) from the memory. This may take various forms. This may further improve security as the device key may be absent during any unauthorised attempt to recover it. The device key or cryptographic material may be deleted in such a way as to make it difficult or impossible to recover (e.g. the storage location may be overwritten one or more times).

Preferably, the logic configured to receive from the server over the communications interface the cryptographic material required to execute the one or more device functions may be protected, encrypted, authenticated or otherwise secured.

Optionally, the logic may be further configured to run a generic bootstrapping architecture, GBA, protocol and further wherein the cryptographic material is received from the server protected using the GBA protocol. Other protocols may be used but GBA has particular advantages when used with M2M devices. Further details of the GBA protocol that is used may be found at http://www.3gpp.org/DynaReport/33220.htm (3GPP TS 33.220 Generic Authentication Architecture (GAA); Generic Bootstrapping Architecture (GBA)). Variants of the GBA may include but are not limited to GBA-push and 2G-GBA (with SIM rather than USIM), for example.

Optionally, the logic may be further configured to delete the cryptographic material from the memory. This may be one (active) way that the device is configured to delete the cryptographic material. Passive methods may also be used.

Optionally, the device may be further configured to delete the cryptographic material triggered by any one or more of:

receiving a command over the communications interface;
powering down the apparatus;
a loss of power to a portion of the memory storing the cryptographic material;
entering a low power mode of the apparatus;
after expiry of a predetermined time;
detection of movement or location change; and/or
detection of a tampering event. Therefore, the device may be automatically secured without user intervention. Other triggers may be used.

Optionally, the one or more functions may include any one or more of:

encryption of content or communications, decryption of content or communications, validation, authentication, validation of a new subscriber identity module, SIM, and firmware update. Other functions may be included.

Preferably, the communications interface may be a cellular interface. Other interface types may be used. This may be wireless (e.g. Wi-Fi) or wired (e.g. Ethernet).

Optionally, the logic may be further configured to receive from the server over the communications interface the cryptographic material during a boot process of the device. Therefore, when the device is booted or initiated (or changes state) then the server may provide access to the device. For example, the server may send the device key to the device. Preferably, this may be in an encrypted form and/or is sent in a way that allows the device key to be authenticated or validated. The server may send other material to the device enabling access to the device key. For example, this may be a decryption key allowing an encrypted device key stored on the device to be decrypted.

Optionally, the device may further comprise memory storing one or more device functions not requiring the cryptographic material to execute. In other words, the device may contain some functions that may operate without the device key (e.g. booting, connecting the interface to a network, GBA protocol to obtain the device key, etc.) and other functions may require access to the device key (e.g. decrypting or encrypting user specific data, sending a meter reading to an external server, receiving and executing operation commands, etc.)

Optionally, the one or more device functions not requiring the cryptographic material to execute may include any one or more of:

a boot-loader, communication over the communications interface, and establishment of a secure communication over the communications interface.

According to a second aspect there is provided a server comprising:

a communications interface for communicating with one or more devices over a network;
a data store configured to store cryptographic material required by the devices to execute one or more functions on the devices; and
logic configured to:
provide the cryptographic material to the devices over the communications interface. The cryptographic material may be the device keys themselves or other keys enabling access (on the devices) to the device keys. The server may be used to provide access to the device key of an above-mentioned device by providing the cryptographic material. The data store or database may be a secured data store. The data store may contain device keys (or cryptographic material enabling access to device keys) associated with identifiers for each device (e.g. a serial number, IMSI, IMEA, etc.) or with a subscriber identification module within each device or separately supplied to end users for fitting into their devices, for example.

Optionally, the data store may be configured to store one or more cryptographic material (e.g. device keys or decryption keys for the device keys) for each device. The device may have more than one device key so that access to device keys may be provided independently (e.g. some functions may be allowed and other prevented by restricting or allowing access to one or more device keys). One item of cryptographic material may enable access to (or be) one device key (or a group of device keys) on a device whilst a second or third (or more) item of cryptographic material may enable access to (or be) a further device key (or further group of device keys) on the device.

Preferably, the data store may contain cryptographic material (e.g. device keys or keys to decrypt device keys) previously deleted from the devices. In other words, the cryptographic material (e.g. device key) maybe the same but repeatedly deleted and then provided by the server under certain circumstances (e.g. at intervals, upon being triggered by an event, power up, etc.)

According to a third aspect there is provided a method comprising the steps of:

deleting from a memory within a device cryptographic material required to execute one or more device functions stored within the device;
receiving from a server over a communications network the cryptographic material; and storing the cryptographic material in the memory.

Optionally, the server may provide the cryptographic material to the device key by retrieving the cryptographic material from a cryptographic material store and sending the cryptographic material to the device over the communications network.

Preferably, the method may further comprise the step of using the cryptographic material to execute one of the device functions. For example, the executed function may use the cryptographic material to decrypt data within the device or the executed function may itself need to be decrypted by the cryptographic material before it is executed. The executed function may require a device key to execute in these ways after the device key is itself decrypted by the cryptographic material, for example.

Advantageously, the cryptographic material may be deleted from the memory within the device following an event selected from the group of events consisting of:

receiving a command over the communications interface from the server;
powering down the device;
a loss of power to a portion of the memory storing the cryptographic material (i.e. passive deletion);
entering a low power mode of the device;
after expiry of a predetermined time;
detection of movement or location change of the device; and/or
detection of a tampering event on or within the device.

Optionally, the method may further comprise the steps of:

decrypting a device key using the cryptographic material; and
executing one of the device functions using the device key.

The device and server (and any of their variations described herein) may form a system. The system may also include a plurality of devices (one or more) and/or servers.

The device may be an M2M device, customer premises equipment (CPE), DSL or cable modem, Wi-Fi router, femtocell, set-top box (for TV etc.) or other home or commercial equipment, for example.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

3GPP's Generic Bootsrapping Architecture (GBA) allows a client device and server to agree a strong and unique shared secret by "bootstrapping" from the key shared between a SIM card (UICC) and HLR/HSS. Advantageously, such a new key can be agreed regularly or whenever needed (for instance on change of owner or reset operations). Transformations based on the shared secret allow other keys to be derived or re-derived as required.

Cellular connectivity is not necessarily required for this bootstrapping as the protocol works over other types of connectivity (e.g. DSL, cable, fibre and Wi-Fi). Therefore, the described method and system may be used for different types of customer premises equipment (CPE) and M2M devices.

Figure 1:
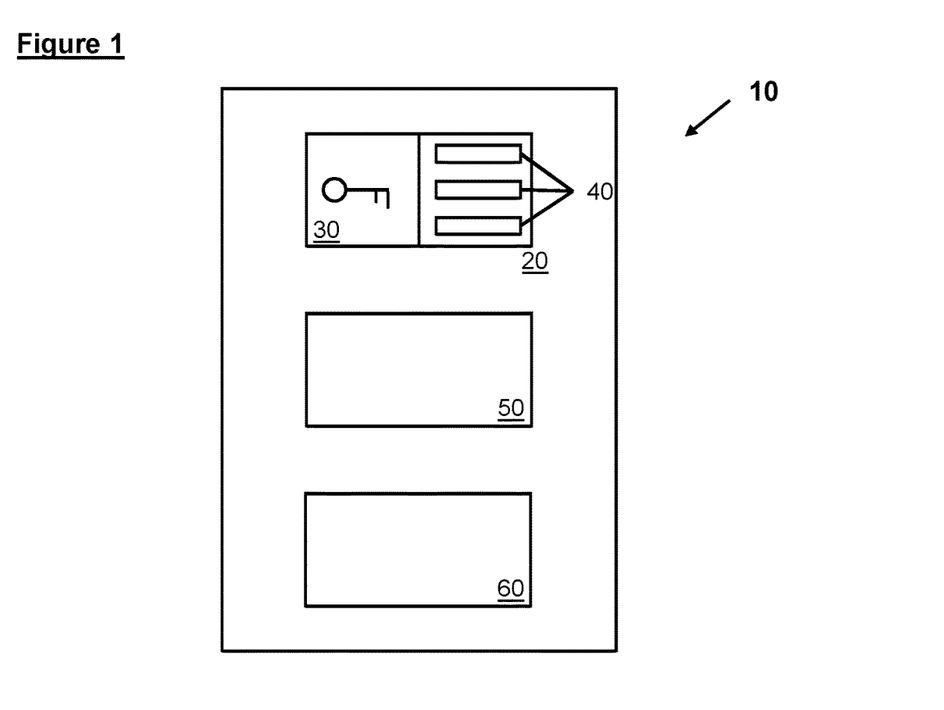
FIG. 1 shows a schematic diagram of a device including a device key, given by way of example only.

FIG. 1 shows a schematic diagram of a device 10 used to store and/or generate sensitive or confidential data. The device 10 includes one or more memory stores 20. The memory store 20 is configured to store a device key 30 and one or more functions 40 that require the use of the device key 30 to operate.

The device 10 also includes a communications interface 50 and program instructions or logic 60 for operating the device 10. The logic 60 also controls access to the device key 30 stored in the memory store 20. This logic 60 can prevent access to the device key 30 in certain circumstances. For example, the logic 60 may delete the device key from the device 10 when certain triggers occur. These triggers may include shutting down or moving the device 10 into a low power state (or from one state to another), tampering with the device, physically moving the device or unusual communications, for example.

The logic 60 may also provide or enable access to the device key 30. This may be achieved by receiving a new or the same device key 30 from an external source such as a server 100, for example.

Figure 2:
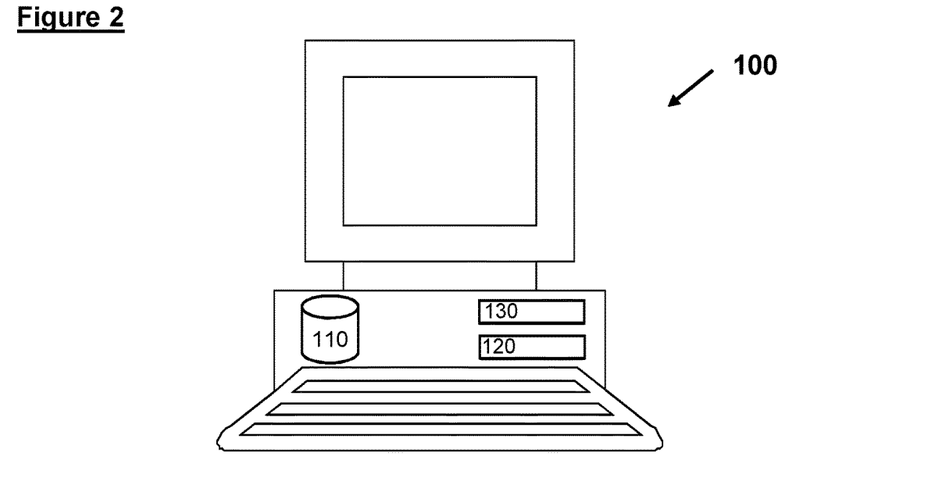
FIG. 2 shows a schematic diagram of a server used to provide the device of FIG. 1 with access to the device key.

FIG. 2 shows a schematic diagram of the server 100 used to enable access to the device key 30 on the device 10. In one example implementation, the server 100 provides the device 10 with a new or the same device key that was deleted by the logic 60. Server 100 contains a database 110 of device keys 30 specific to a plurality of devices 10. The server 100 also includes a communications interface 120 for communicating with devices 10 (e.g. to the devices' communications interfaces 50). Server 100 also includes program instructions 130 used to provide access to the device keys 30 and/or send device keys 30 to corresponding devices 10.

Figure 3:
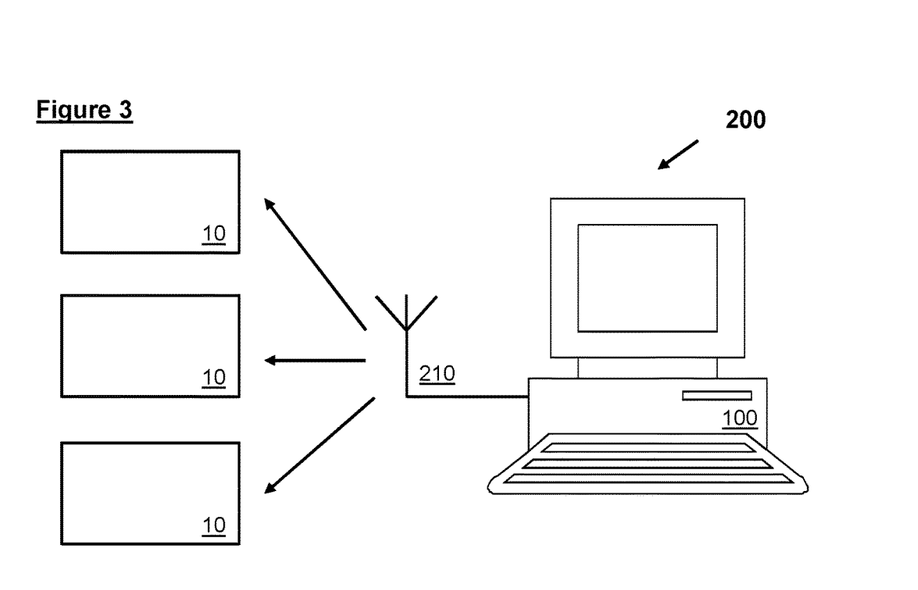
FIG. 3 shows a schematic diagram of a system including the device of FIG. 1 and the server of FIG. 2.

FIG. 3 shows a schematic diagram of a system 200 formed from a plurality of the devices 10 described with reference to FIG. 1 and the server 100 described with reference to FIG. 2. The system 200 may comprise many more devices 10 of the same or different types and also multiple servers 100 that may be included for load balancing purposes, for example.

FIG. 3 shows the devices 10 and server 100 forming a network. In this example, the server sends the devices cryptographic (or other) material for enabling access to device keys 30 on each device 10 so that functions requiring the device keys 30 may be performed within the devices 10. The cryptographic material may be the device keys themselves, keys or portions of keys enabling access to the device keys 30 (e.g. decrypting them within the device) or other data enabling access. In the example shown in FIG. 3, the network is a cellular network and the devices are in communication with a base station 210 of the cellular network and the server 100 also maintains a connection with the cellular network (or maybe part of the cellular network, for example). Other networks, both wireless and wired, may be used.

Figure 4:
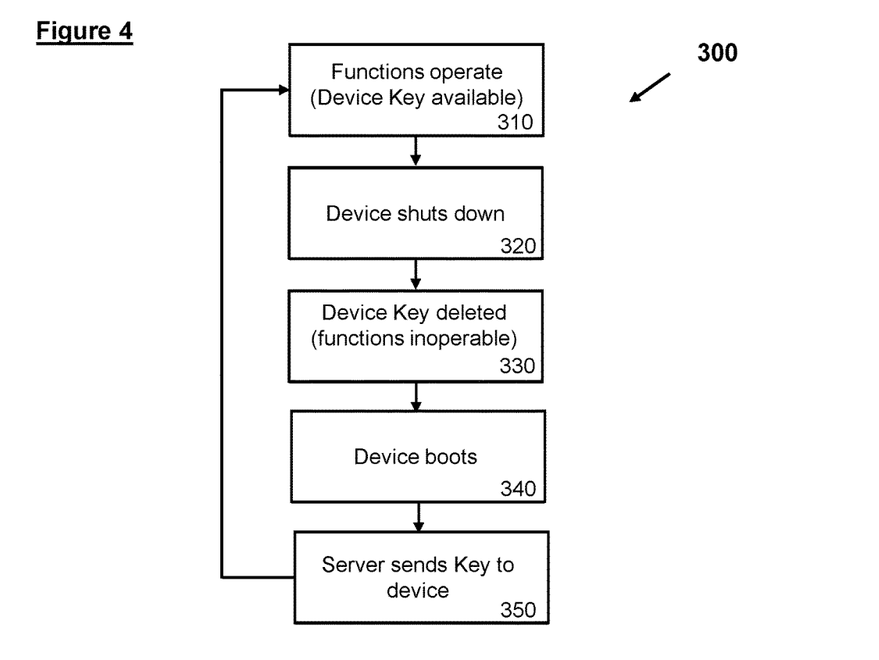
FIG. 4 shows a flowchart of a method for operating the system of FIG. 3, given by way of example only.

FIG. 4 shows a flowchart of a method 300 for operating the system 200 described with reference to FIG. 3. In particular, this method 300 describes the various states of each device 10 and the interactions of each device 10 with the server or management server 100.

At step 310 the device key 30 is available to the device 10 and so the functions 40 are operable. At step 320, the device shuts down (or another trigger or action occurs to cause the device key 30 to become unavailable). In this example method, the device key is deleted at step 330 but this could be an encryption process or other way to make the device key 30 unavailable. At step 340 the device 10 boots. Certain functions may remain available to allow the device to boot and connect to the network, as well as functions that do not rely on enhanced security, whilst other functions and data may be unavailable (i.e. functions to decrypt data stored within the device 10). Following or as part of the device boot procedure, the device 10 communicates across a network with a server 100. In this example, the server 100 sends the device 10 its particular device key 30 (step 350) although this could be other cryptographic material enabling access to the device key and therefore allowing the functions to operate again (i.e. the method returns to step 310).

Figure 5:
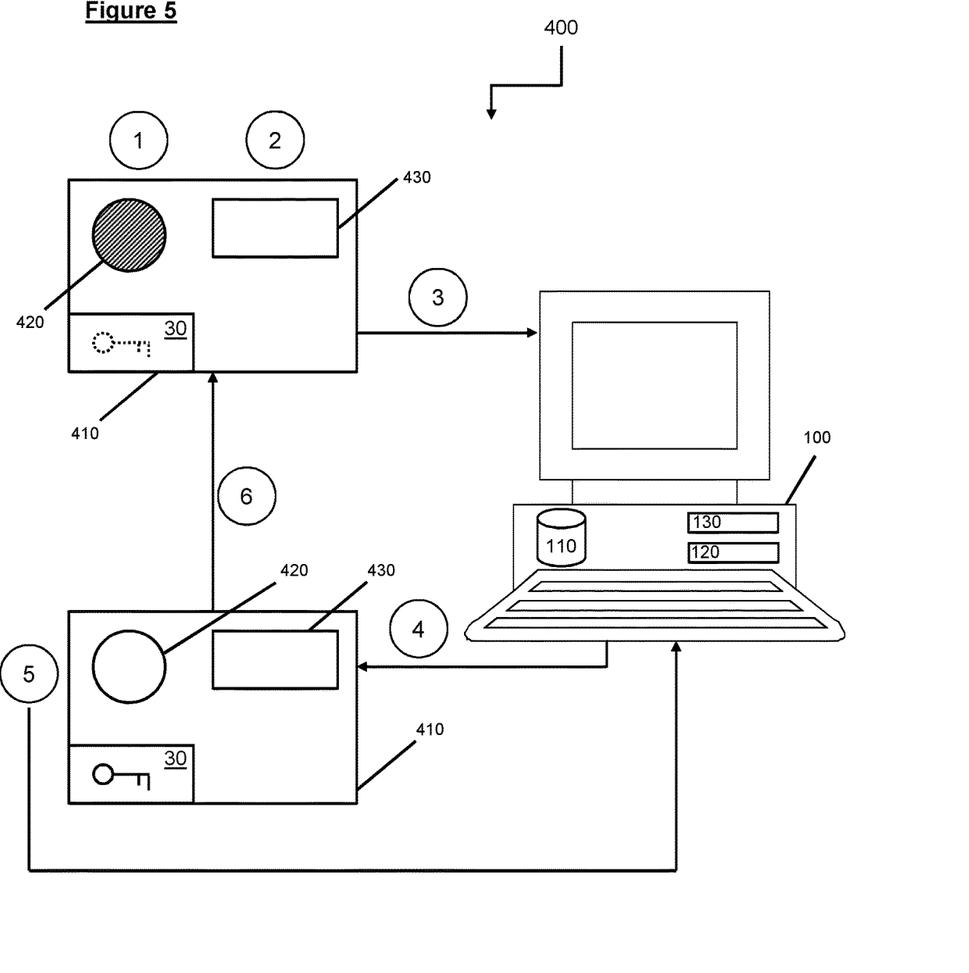
FIG. 5 shows a schematic diagram of a further example system.

FIG. 5 shows a schematic diagram of an example implementation 400 of the method of FIG. 4. In this example, the device 410, 410' transitions from a first state where the device key 30 is not available (or not present) and data may be unintelligible (because it is encrypted and the decryption key is missing or otherwise unavailable) to a second state where the device key 30 is available and the data become intelligible (i.e. decryptable because the decryption key is present).

In this example the device key 30 is a symmetric key and may be used for encryption, decryption and integrity purposes. However, asymmetric keys may be used and a separate key may be used for integrity and authentication. In this simple example the device key 30 may be a single "device-specific-encryption key" (DSEK). However, in this example, the DSEK may be replaced by any device key 30.

The circled numbers shown in FIG. 5 correspond with the following numbered steps.

1. While powered off and in a low-power or sleeping state (first state), the device 410 does not have a local copy of its DSEK 30. If the device is stolen or tampered with in this state, then it will be difficult or impossible for the attacker to decrypt anything on the device. Loading of fake code or data onto the device can also be prevented in this state. The data 420 within the device 410 is shaded in this figure to illustrate that it is encrypted and that the decryption function cannot be performed as the DSEK 30 is missing.

2. In the first state of the device 410, some functions may be performed that do not require access to the missing DSEK 30. These core functions may be stored (or burned into) a ROM 430 or other permanent storage, for example. Core functions of the device 410 that do not need the DSEK 30 may include an initial boot-loader and some base code to allow connectivity (e.g. to a cellular network or other network), which may be fixed function code. In some example implementations, the ROM may be fabricated to be too big to remove without damaging or destroying the device 10).

3. In this example, the core functions include the ability (towards the end of the boot process) to run the generic bootstrapping architecture (GBA) protocol and establish a secure (encrypted and integrity protected) session with a management server 100. Note that such a session may be protected via fresh session keys whenever it is established. TLS or DTLS may be used, for instance.

4. The management server 100 stores a copy of the device's DSEK 30 within its own database 100 (preferably a protected memory area). The management server 100 may store the DSEKs 30 of a plurality of devices 410. After the boot process and GBA set-up has completed, the management server 100 delivers the DSEK 30 to the device 410' over the secure session. The device 410' is now in its second state.

5. The device 410' may now execute functions that require access to the device key 30. For example, the device 410' may carry out decryption and/or verification functions (to determine data integrity) on its device-specific data and code 420. This is illustrated in FIG. 5 by the non-shaded data 420 within device 410' (i.e. now available and accessible). The device 410' may create additional data or code (all encrypted/integrity protected using the DSEK 30). Furthermore, the device 410' may readily exchange additional data and code with the management server 100, which can also use the DSEK 30 to generate or verify said code. No decryption/re-encryption operations are required for this.

6. On power-off or return to a sleeping state (transition from the second state to the first state of the device 410, 410') the device will erase its DSEK 30 and return to step 1. This erasing process (or otherwise making the DSEK 30 unavailable) may also be triggered by one or more further events such as detecting various tampering conditions while powered up or receiving an instruction from the management server 100.

Variations may include changing the DSEK 30 at various intervals and upon various triggers. This may require a re-installation of corresponding re-encrypted code and data by the management server 100. A full firmware update may be a suitable time to do this. Migration between DSEKs 30 e.g. decryption and re-encryption, may be carried out a block at a time to smooth the process.

If the device 10, 410, 410' cannot connect to the management server 100, then it may be unable to retrieve its DSEK 30 (or otherwise make it available to the device). This may be mitigated by careful distribution of functions between the core code (within the ROM 430) and other code or functions 40 requiring access to the DSEK 30. However, as the device 10, 410, 410' is usually intended to be a connected device then its functionality may already be limited when it is disconnected.

This system 200 and method 300 improves data encryption at rest and in motion and of data integrity at rest and at motion. The ability to change a DSEK 30 further protects against version rollback.

As will be appreciated by the skilled person, details of the above embodiment may be varied without departing from the scope of the present invention, as defined by the appended claims.

For example, whilst a single DSEK or device key 30 for each device 10, 410, 410' has been described, there may be different (i.e. multiple) DSEKs or device keys 30 for different types of code and data. These may also be managed centrally or by different parties and services.

A further enhancement to the system may require the management server 100 to include a backup copy of the DSEKs 30 (or use a backup server, distributed server, cluster, RAID storage or other mechanism) to prevent loss of data across multiple devices 10, 410, 410'.

A number of counter-measures may be deployed against indirect forms of attack, such as attempting to compromise the management server 100 (or back-up server). This may include protecting the DSEKs 30 on the management server using a hardware security module (HSM) or using distributed "m from n" storage and key recovery mechanisms, for example.

Preferably, the security may be based on a device's SIM card/UICC. If the UICC is moved into a different device 10, 410, 410' then this may also allow the device-specific data to be transferred. This can be an advantage in some cases, but may also represents a security threat, which may be mitigated by used a soldered or embedded SIM, or by cryptographically "locking" the SIM card to a specific device.

Devices 10, 410, 410' which are known to be stolen or compromised can just have their SIMs barred, so the GBA protocol can no longer run. The management server 10 may additionally or alternatively mark the DSEK 30 as not to be distributed. Temporary forms of barring or suspension may also be used where there is suspicion of theft or compromise. Environmental monitoring (by device 10, 410, 410' or server or combination of these) may provide clues to suspicious behaviour and may trigger an alert to a legitimate user of the device 10, 410, 410' (for example, at the next request for the DSEK 30). A user may then approve or reject the release of the DSEK 30.

The device 10, 410, 410' may be protected from theft or compromise whenever it does not have its DSEK (device key 30). The flow may be arranged so that the DSEK 30 is available to the device only when needed, and in that window the device may also have active (powered-up) measures to detect tampering. For example, the device 10, 410, 410' may use location detection to check if it has been moved without warning. Other forms of environmental monitoring, like checking status of other equipment in an in-vehicle environment, may be used. For particularly high risk or high value implementations (e.g. vehicle security) there may be two location tracking devices where one may be irremovable from the vehicle. If these location devices give inconsistent readings then the removal of the DSEK-protected device 10, 410, 410' from the vehicle may be indicated.

A key to unlock the device key may be regarded as another device key (i.e. cryptographic material required to execute one or more device functions) though not necessarily a DSEK, since it is not directly used to encrypt or decrypt anything on the device. The device key may therefore be described as a key for encrypting or decrypting data or code on the device (e.g. DSEK). Cryptographic material may be the device key (e.g. DSEK), or any key that is used to protect or unlock the device key or DSEK.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A device comprising:
   active memory that requires power to store data and that is configured to store cryptographic material required to execute one or more device functions;
   a communications interface for communicating over a network; and
   logic configured to:
   receive, from a server over the communications interface, the cryptographic material required to execute the one or more device functions;
   store the cryptographic material in the active memory, wherein the device is configured to cause the cryptographic material to become unavailable for use in the active memory in response to a detection of one or more triggers, and wherein causing the cryptographic material to become unavailable for use in the active memory includes deleting the cryptographic material; and
   upon detection of a firmware or other software version update of the device and to protect against version rollback, change the cryptographic material during the firmware or other software version update,
   whereby the cryptographic material is protected from being used maliciously as a result of how the cryptographic material is stored and as a result of how the cryptographic material is managed upon detection of certain triggering events.

2. The device of claim 1, wherein the cryptographic material is a device key.

3. The device of claim 1, wherein the logic is further configured to run a generic bootstrapping architecture (GBA) protocol, and wherein the cryptographic material is received from the server and is protected using said GBA protocol.

4. The device according to claim 1, wherein the one or more device functions include any one or more of:
   encryption of content or communications, decryption of content or communications, validation, authentication, validation of a new subscriber identity module (SIM) and firmware update.

5. The device according to claim 1, wherein the communications interface is a cellular interface.

6. The device according to claim 1, wherein the logic is further configured to receive from the server over the communications interface the cryptographic material during a boot process of the device.

7. The device according to claim 1, further comprising memory storing one or more other device functions not requiring the cryptographic material to execute.

8. The device of claim 7, wherein the one or more other device functions not requiring the cryptographic material to execute include any one or more of:
   a boot-loader, communication over the communications interface, and establishment of a secure communication over the communications interface.

9. The device according to claim 1, wherein the device further comprises at least one of:
   customer premises equipment (CPE);
   a machine to machine (M2M) device;
   a DSL or cable modem; or
   a Wi-Fi router.

10. The device of claim 1, wherein the logic is further configured to detect a tampering event in which the device is being tampered.

11. The device of claim 1, wherein the cryptographic material is a device key, and wherein the device key is a symmetric key usable for encryption, decryption, and integrity checking.

12. The device of claim 1, wherein the cryptographic material is a device key, and wherein the device key is an asymmetric key, and wherein a separate key is used for integrity checking and authentication.

13. The device of claim 1, wherein the cryptographic material is a device key, and wherein the device key is a single device-specific-encryption key (DSEK).

14. The device of claim 13, wherein, upon powering off or returning to a sleeping state, the device erases the DSEK.

15. A method comprising the steps of:
   receiving from a server over a communications network cryptographic material;
   storing the cryptographic material in an active memory within a device, the active memory requiring power to store data;
   in response to a detection of one or more triggers, causing the cryptographic material to become unavailable for use in the active memory, the cryptographic memory being required to execute one or more device functions stored within the device, wherein causing the cryptographic material to become unavailable for use in the active memory includes deleting the cryptographic material; and
   upon detection of a firmware or other software version update of the device and to protect against version rollback, changing the cryptographic material during the firmware or other software version update, whereby the cryptographic material is protected from being used maliciously as a result of how the cryptographic material is stored and as a result of how the cryptographic material is managed upon detection of certain triggering events.

16. The method of claim 15, wherein the server provides the cryptographic material to the device by retrieving the cryptographic material from a cryptographic material store and sending the cryptographic material to the device over the communications network.

17. The method of claim 15, wherein the method further comprises using the cryptographic material to execute one of the one or more device functions.

18. The method according to claim 15, wherein the method further comprises:

decrypting a device key using the cryptographic material; and executing one of the one or more device functions using the device key.

19. The method according to claim 15, wherein the device further comprises at least one of:

customer premises equipment (CPE);

a machine to machine (M2M) device;

a DSL or cable modem; or a Wi-Fi router.

20. The method according to claim 15, wherein the cryptographic material is received during a boot process of the device.

* * * * *